May 11, 1965     A. F. OATLEY     3,182,652
GRILLING APPLIANCE HAVING PIVOTED SUPPORT MEANS
Filed May 2, 1963     2 Sheets-Sheet 1
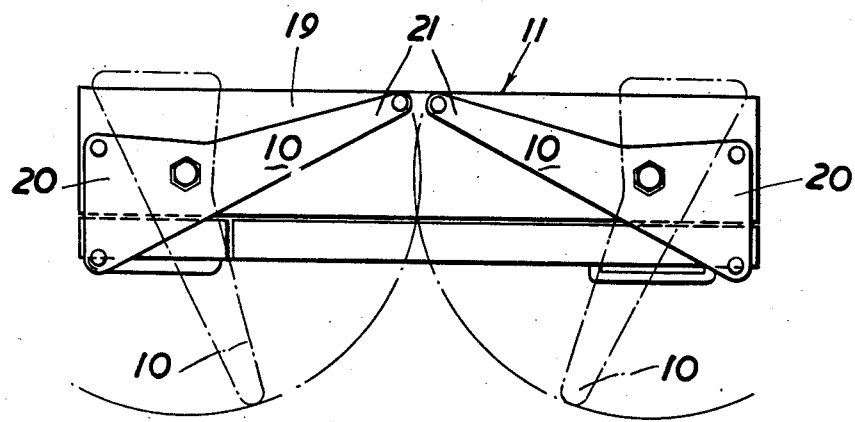
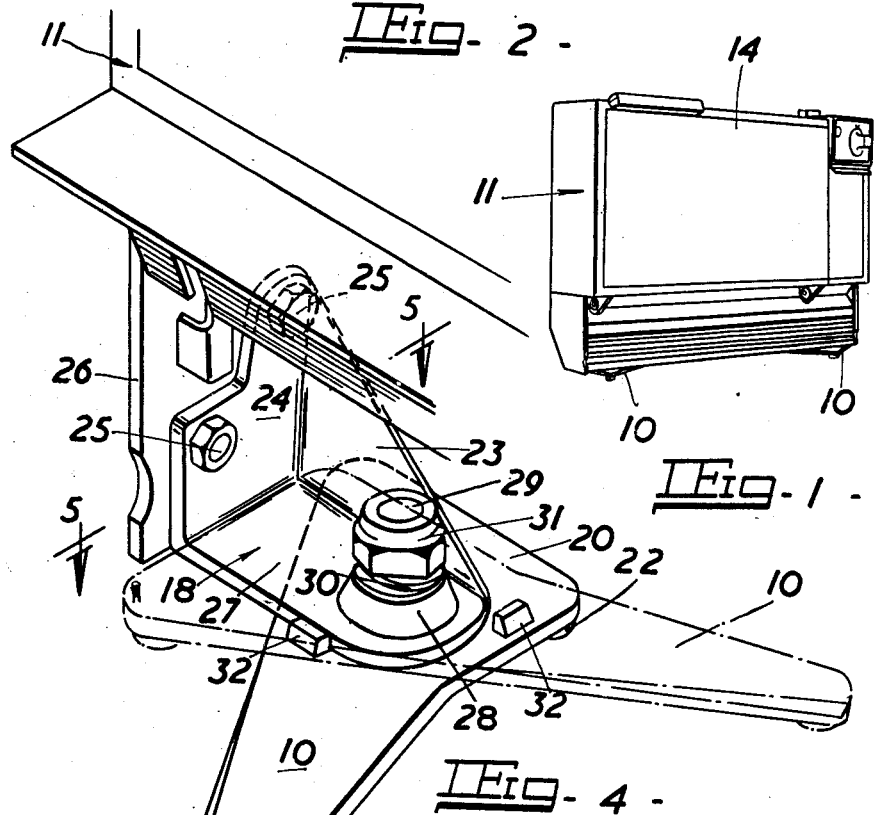

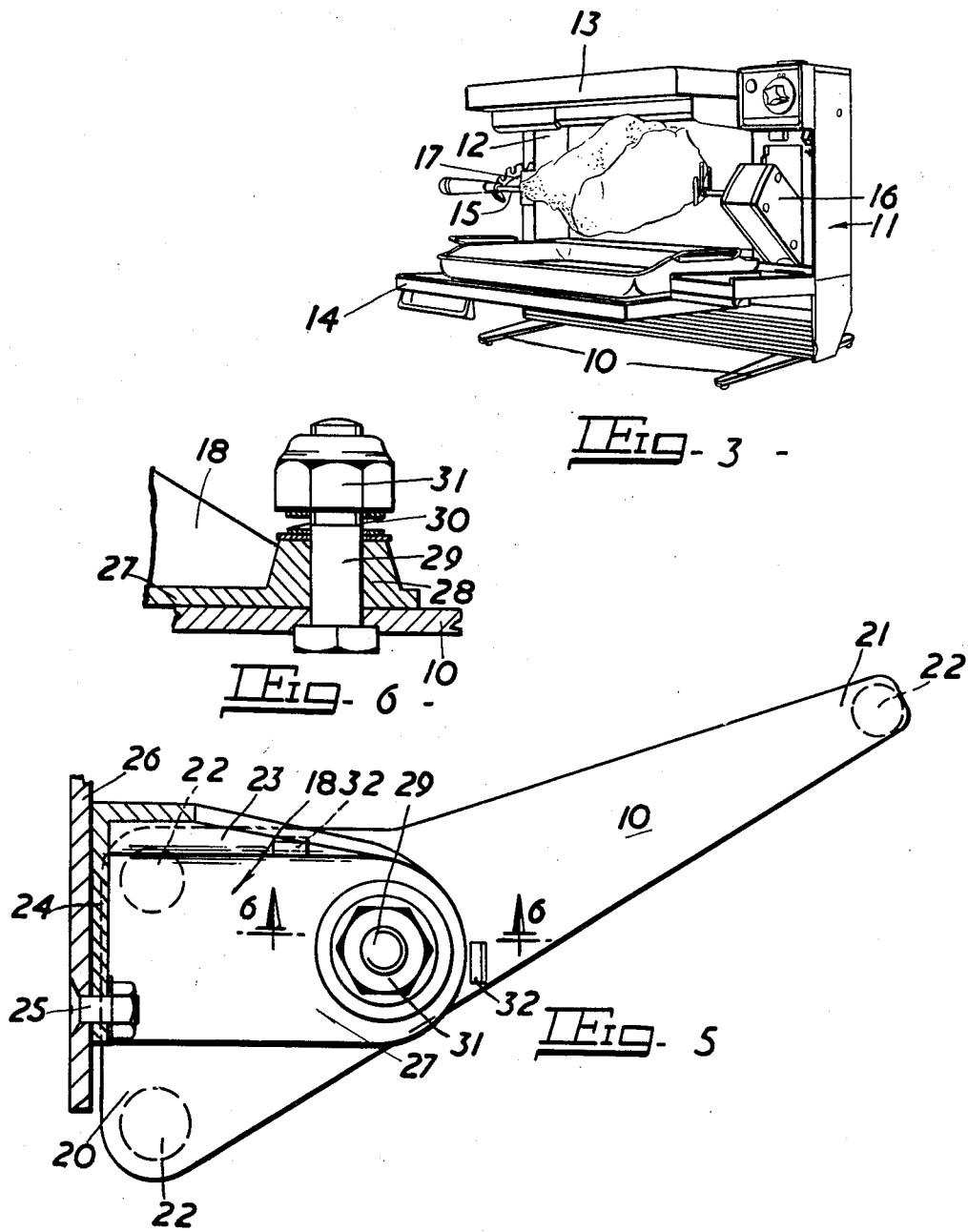

United States Patent Office 3,182,652
Patented May 11, 1965

3,182,652
GRILLING APPLIANCE HAVING PIVOTED
SUPPORT MEANS
Arthur Frederick Oatley, Wilton Lodge, Wergs Road,
Tettenhall, Wolverhampton, England
Filed May 2, 1963, Ser. No. 277,505
1 Claim. (Cl. 126—38)

This invention relates to gas or electric grilling appliances which are independent of a cooker and are portable.

The present invention consists in an independent, portable grilling appliance having a radiant surface mounted on a supporting structure for movement between a substantially horizontal position of use and a vertical stored position in or against the supporting structure, the depth of the supporting structure being considerably less than its height, wherein feet are provided on the supporting structure which are capable of being moved between a position in which they lie substantially within the plan area of the supporting structure when the radiant surface is stored away, and yet provide adequate support to maintain the folded appliance in a stable condition, and a position in which, when the radiant surface is in the horizontal in-use position, they provide at least part of a more widely spread base for the appliance to resist the tendency towards instability produced in the appliance by the cantilever effect of the radiant surface and food being grilled or spit roasted on the supporting structure.

By the depth of the supporting structure, is meant the dimension between the front and back of the supporting structure.

There may, in addition, be feet on the supporting structure in fixed positions which contribute towards the required stability of the appliance.

An embodiment of the invention will now be described by way of example with reference to the accompanying drawings in which, FIGURE 1 is a front perspective view of an independent, portable grilling appliance shown in its out of use condition.

FIGURE 2 is a plan view of the underside of the grilling appliance in the out of use condition.

FIGURE 3 is a front perspective view of the grilling appliance in use.

FIGURE 4 is an enlarged perspective detail view of a foot for supporting the grilling appliance, being shown in full in a position which it occupies when the appliance is in use and in broken lines in another position which it occupies when the appliance is not in use.

FIGURE 5 is a section on line 5—5 of FIGURE 4 with the foot in the position which it occupies when the grilling appliance is not in use.

FIGURE 6 is a section on line 6—6 of FIGURE 5.

In this embodiment feet 10 are provided on a grilling appliance of the kind described in my U.S. patent application Serial No. 833,834 filed August 14, 1959, and may be either gas or electrically heated. The grilling appliance has a supporting structure 11 in the form of a sheet metal casing which includes a recess 12 in which a radiant surface 13 of the appliance is pivotally mounted for movement between a horizontal position of use and a vertical stored position in which it is received within the recess 12. When the radiant surface 13 is in the in-use position it extends substantially at right angles to the upper end of the supporting structure 11, as shown in FIGURE 3, and is downwardly directed. Food can be either grilled or spit roasted below the radiant surface. In the case of grilling, the food is supported on a food support 14 extending horizontally below the radiant surface 13 and hinged to the supporting structure 11 so that it can be swung upwards when the radiant surface is stored away to close the recess 12, as shown in FIGURE 1. In spit roasting, as shown in FIGURE 3, a spit 15 is supported horizontally below the radiant surface by, at one end, a drive coupling, not shown, of an angularly movable power unit 16 and at the other end, the handle end, a supporting arm 17, the power unit 16 and arm 17 both being pivotally mounted in the supporting structure. After use the power unit 16 and supporting arm 17 can be returned to positions in which they are entirely retained within the supporting structure, the radiant surface is swung downwards into the recess 12 and the food support 14 is swung upwards against the front of the supporting structure to close the recess.

When the grilling appliance is not in use and the radiant surface is folded away the grilling appliance is a compact narrow rectangular unit and all its mass is centered directly above the base of the supporting structure. In use, however, the mass of the whole appliance is not disposed directly above the base of the supporting structure but is centred somewhat towards the front of the supporting structure. Thus, owing to the depth of the supporting structure being small in relation to its height, without the provision of adequate means of support for the appliance, the stability of the appliance would be very much reduced and with a large meat joint such as is shown in FIGURE 3 supported under the radiant surface the appliance might well fall over forwards. This eventuality is prevented by the provision on the appliance of the feet 10 which are shaped and connected to the appliance in such a way that it will remain completely stable whether in or out of use.

Two feet 10 are provided which are pivotally connected for movement about a vertical axis to brackets 18, FIGURES 4 and 5, secured to the supporting structure below a bottom wall 19 of the casing. The feet are metal castings but could of course be otherwise suitably formed, and each is in the general plan shape of an obtuse-angled triangle, as shown in FIGURES 2 and 5. A base portion 20 of the triangle is slightly less in length than the depth of the supporting structure and an apex portion 21 of the triangle is spaced from the base 20 a distance equal to half the length of the supporting structure and therefore substantially greater than the depth of the supporting structure. At each corner, on the underside of the foot, there is a rubber stud 22 which is suitably anchored to the foot. The studs 22, instead of being of rubber, may be of some other material or be formed integrally with the foot. Each foot is pivotally connected to the bracket 18 at a point corresponding substantially to the centre of area of the triangle. The brackets 18 are metal castings and are of L-section with a strenghtening web 23. An upright limb 24 of the bracket is secured by bolts 25 to a side wall 26 of the casing which extends below the bottom wall 19, so that a horizontal limb 27 of the bracket extends inwards underneath the bottom wall 19 and at right angles to the bottom edge of the side wall 26. At the free end of the horizontal limb 27 of the bracket the metal thickness is increased and a journal 28 is provided. The foot is secured to the bracket by a bolt 29, FIGURE 6, passing through the foot from the underside and engaging and projecting through the journal 28, a spring washer 30 being fitted around the projecting end of the bolt 29, and a self-locking nut 31 secures the foot firmly but pivotally to the bracket. The length of the horizontal limb 27 of each bracket is such that when the feet occupy one particular position, as shown in FIGURES 2 and 5, the base portion 20 of the triangular shape of each foot lies adjacent and parallel to the bottom edge of the side wall 26 of the casing and the apex portions 21 of the two feet lie close together near to and below the mid-point of the rear edge of the bottom wall 19. This is the position which the feet occupy when the appliance is folded away, the spacing of the studs 22 being such that the feet provide adequate support for the appliance to maintain its stability. When the appliance is to be used the feet are turned about their pivotal connections, as indicated in broken lines in FIGURE 2, to a position, as shown in FIGURES 3 and 4, in which the apex portion 21 of each foot is extending in front of the supporting structure and the base portion 20 is disposed parallel to, and substantially underneath, the back wall of the casing. Thus the notional plan area which is defined by the spaced studs on the two feet is greatly increased and the apex portion of each foot extends sufficiently from the front edge of the supporting structure to prevent the appliance falling over. Each foot is restricted to movement only between the two positions described above by stops 32 cast integrally with the foot on its upper surface.

In an alternative arrangement, not illustrated, support for the appliance may be provided by spaced studs secured in fixed positions to the base of the appliance along the back wall of the supporting structure and at least two angularly movable feet pivotally connected for movement about a vertical axis to the base of the appliance near to the front of the supporting structure. The angularly movable feet may each be in the form of a rectangular plate which is pivotally connected at one end to a bracket secured to the supporting structure and which has a downwardly directed supporting protrusion such as a stud, as in the previous example, at the other end. When the appliance is folded away the feet are disposed in a position in which the supporting protrusions lie along the bottom edge of the front wall of the supporting structure and when the appliance is in use the feet are turned about their pivotal connections to a position in which the protrusions are disposed in front of the supporting structure, as in the previous example, to prevent the appliance falling over.

I claim:

In an independent portable grilling appliance having a supporting structure the depth of which is considerably less than its height and a radiant including means for movably mounting the radiant on the supporting structure, the radiant having a substantially horizontal position of use in which it extends forward from the supporting structure in the direction of the depth of the supporting structure and a vertical stored position against the supporting structure, the improvement comprising a pair of supporting feet mounted underneath the supporting structure, each of said feet being of general triangular shape and pivotally mounted near the center of the area thereof to the support structure about a vertical axis, each of said feet having supporting protrusions proximate each corner thereof, two of said protrusions being spaced apart a distance less than the depth of the supporting structure, the third of said protrusions being spaced from each of the other of said protrusions a distance substantially greater than the depth of the supporting structure, said feet being movable about the pivotal mounting thereof between a condition in which they lie substantially within the plan area of the supporting structure such that the protrusions afford a base which is well spread in the depth of the supporting structure and a condition in which one protrusion of each foot extends forward from the supporting structure in the same direction as the radiant in its position of use so that the feet form a base more widely spread in the direction of the depth of the supporting structure.

References Cited by the Examiner
UNITED STATES PATENTS

| | | | |
|---|---|---|---|
| 2,331,931 | 10/43 | Robinson | 126—38 X |
| 2,397,766 | 4/46 | Tullis | 246—183 |
| 2,465,572 | 3/49 | Bramming | 126—38 |
| 2,849,948 | 9/58 | Rowley | 126—30 X |
| 2,940,381 | 6/60 | Cottongim et al. | 126—25 X |
| 2,972,942 | 2/61 | Goldberg | 99—421 |
| 3,064,554 | 11/62 | Lamb | 126—37 |

JAMES W. WESTHAVER, *Primary Examiner.*